(12) United States Patent
Matsumoto et al.

(10) Patent No.: US 9,162,431 B2
(45) Date of Patent: Oct. 20, 2015

(54) LAMINATE FILM

(75) Inventors: Nobuhiko Matsumoto, Kanagawa (JP);
Eiichi Honda, Kanagawa (JP); Kana Okada, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 473 days.

(21) Appl. No.: 13/813,012

(22) PCT Filed: Jul. 26, 2011

(86) PCT No.: PCT/JP2011/066995
§ 371 (c)(1),
(2), (4) Date: Jan. 29, 2013

(87) PCT Pub. No.: WO2012/017866
PCT Pub. Date: Feb. 9, 2012

(65) Prior Publication Data
US 2013/0130062 A1    May 23, 2013

(30) Foreign Application Priority Data

Aug. 5, 2010  (JP) ................................ 2010-176284

(51) Int. Cl.
| B32B 9/00 | (2006.01) |
|---|---|
| B32B 27/28 | (2006.01) |
| B32B 27/00 | (2006.01) |
| B32B 27/34 | (2006.01) |
| B32B 27/08 | (2006.01) |
| B32B 27/12 | (2006.01) |
| B32B 27/30 | (2006.01) |
| B32B 27/32 | (2006.01) |
| B32B 27/36 | (2006.01) |
| B32B 27/40 | (2006.01) |
| B32B 27/42 | (2006.01) |
| C09J 133/02 | (2006.01) |
| B32B 17/10 | (2006.01) |

(52) U.S. Cl.
CPC ................. *B32B 27/28* (2013.01); *B32B 27/00* (2013.01); *B32B 27/08* (2013.01); *B32B 27/12* (2013.01); *B32B 27/308* (2013.01); *B32B 27/32* (2013.01); *B32B 27/34* (2013.01); *B32B 27/36* (2013.01); *B32B 27/40* (2013.01); *B32B 27/42* (2013.01); *C09J 133/02* (2013.01); *B32B 2255/10* (2013.01); *B32B 2255/26* (2013.01); *B32B 2307/31* (2013.01); *B32B 2307/518* (2013.01); *B32B 2307/7244* (2013.01); *B32B 2439/46* (2013.01); *B32B 2439/70* (2013.01); *B32B 2439/80* (2013.01)

(58) Field of Classification Search
USPC ........ 428/216, 220, 474.4; 156/189, 190, 191
See application file for complete search history.

(56) References Cited

U.S. PATENT DOCUMENTS

| 5,536,775 A * | 7/1996 | Curatolo et al. ............... 525/530 |
|---|---|---|
| 6,495,624 B1 * | 12/2002 | Brown .......................... 524/462 |
| 7,268,179 B2 * | 9/2007 | Brown .......................... 524/548 |
| 2013/0028540 A1 | 1/2013 | Matsumoto et al. |

FOREIGN PATENT DOCUMENTS

| EP | 2562194 | 2/2013 |
|---|---|---|
| JP | 5-51574 | 3/1993 |
| JP | 9-316422 | 12/1997 |
| JP | 10-71664 | 3/1998 |
| JP | 2000-154365 | 6/2000 |
| JP | 2002-256208 | 9/2002 |
| JP | 2003-128022 | 5/2003 |
| JP | 2004-323053 | 11/2004 |
| JP | 2006-045528 | 2/2006 |
| JP | 2008-081529 | 4/2008 |
| JP | 2008-188975 | 8/2008 |
| WO | 99/60068 | 11/1999 |

OTHER PUBLICATIONS

Search report from International Application No. PCT/JP2011/066995, mail date is Oct. 25, 2011.
Search report from E.P.O., in EP11814494.8, mail date is Dec. 6, 2013.

* cited by examiner

*Primary Examiner* — Terressa Boykin
(74) *Attorney, Agent, or Firm* — Greenblum & Bernstein, P.L.C.

(57) ABSTRACT

Provided is a gas-barrier laminate film that has a layer containing a one-pack adhesive coating material layer having good adhesiveness to various substrates and containing a polyamine resin. The laminate film has at least a substrate, an adhesive coating material layer and a sealant layer laminated in this order, wherein the adhesive coating material to form the adhesive coating material layer contains a polyamine resin, the polyamine resin contains a skeletal structure represented by the following formula (1) in an amount of at least 40% by mass, and the polyamine resin contains a metal atom in an amount of from 2.0 to 20 mol % relative to the nitrogen atom contained in the polyamine resin:

(1)

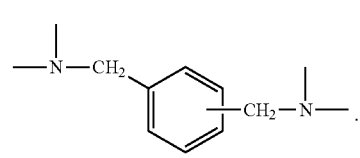

8 Claims, No Drawings

LAMINATE FILM

TECHNICAL FIELD

The present invention relates to a laminate film. Precisely, the present invention relates to a laminate film for use for wrapping materials for foods, drugs and others for the purpose of storage of contents, in which is used an adhesive coating material excellent in shieldability from various gases.

BACKGROUND ART

Recently, for the reasons of the strength, the ability to protect products and the working environment aptitude as wrapping materials and of the advertising effect by printing thereon, complex flexible films containing a combination of different types of polymer materials have become the mainstream in the art. Such complex films generally have a thermoplastic film layer to be the outer layer that plays a role of product protection, and a thermoplastic film layer to be a sealant layer; and for sticking these, there is employed a dry lamination method of applying an adhesive to a laminate film layer followed by adhering a sealant layer thereto, or an extrusion lamination method of optionally applying an anchor coating agent to a laminate film layer followed by melting and applying a plastic film to be a sealant layer thereto under pressure for film-like lamination.

The mainstream of the adhesive to be used in these methods is, in general, a two-pack polyurethane adhesive that contains a main ingredient having an active hydrogen group such as a hydroxyl group or the like and a curing agent having an isocyanate group, from the viewpoint of the high adhesive performance thereof (see Patent References 1 and 2).

However, in general, the curing reaction of the two-pack polyurethane adhesive of the type is not so rapid, and therefore the adhesive requires curing promotion by aging for a long period of time of from 1 to 5 days after sticking therewith, for securing sufficient adhesion. In addition, the adhesive uses a curing agent having an isocyanate group, and therefore in case where the unreacted isocyanate group remains after curing, the remaining isocyanate group would react with moisture in air to generate carbon dioxide, therefore bringing about a problem in that bubbles may form inside the laminate film.

On the other hand, as a method for solving the problem, there are proposed a polyurethane adhesive and an epoxy adhesive for lamination (see Patent References 3 and 4).

However, the gas barrier property of the polyurethane adhesive and the epoxy adhesive for lamination mentioned above is not good, and therefore, in use thereof for wrapping materials that require gas barrier performance, a layer capable of playing a role of adhesion such as an adhesive layer, an anchor coat layer or the like must be additionally laminated between a gas barrier layer such as a PVDC coat layer, a polyvinyl alcohol (PVA) coat layer, an ethylene-vinyl alcohol copolymer (EVOH) film layer, a polymetaxylylenadipamide film layer, an inorganic substance deposited film layer with alumina, silica or the like deposited thereon or the like, and a flexible polymer film layer to be a sealant layer (see Patent Reference 5), which is, however, disadvantageous in that the laminate film production cost would increase and the lamination working process would be complicated.

As a method for solving the problem, there is proposed an adhesive for gas-barrier lamination (see patent Reference 6). However, though the proposed epoxy resin composition could exhibit a good gas barrier property, it is a two-pack adhesive, and therefore, its pot life is short. Accordingly, a one-pack gas-barrier adhesive coating material having good workability is desired.

CITATION LIST

Patent References

Patent Reference 1: JP-A-5-51574
Patent Reference 2: JP-A-9-316422
Patent Reference 3: JP-A-2000-154365
Patent Reference 4: WO99/60068
Patent Reference 5: JP-10-71664
Patent Reference 6: JP-A-2002-256208

SUMMARY OF THE INVENTION

Problems that the Invention is to Solve

An object of the present invention is to provide a gas-barrier laminate film that has a layer containing a one-pack adhesive coating material having good adhesiveness to various substrates and containing a polyamine resin.

Means for Solving the Problems

For solving the above-mentioned problems, the present inventors have assiduously studied and, as a result, have found that an adhesive coating material containing a specific polyamine resin exhibits excellent performance of the polyamine resin therein, high gas barrier performance and good adhesiveness to various substrates and, as being a type of one-pack adhesive, the adhesive coating material secures a greatly prolonged pot life and provides good workability, and that, when a substrate film and a sealant film are stuck together with the adhesive coating material, then a laminate film having a gas barrier property and excellent in adhesiveness can be provided economically, and have reached the present invention.

Specifically, the present invention is as follows:

1. A laminate film having at least a substrate, an adhesive coating material layer, and a sealant layer laminated in this order, wherein the adhesive coating material to form the adhesive coating material layer contains a polyamine resin, the polyamine resin contains a skeletal structure represented by the following formula (1) in an amount of at least 40% by mass, and the polyamine resin contains a metal atom in an amount of from 2.0 to 20 mol % relative to the nitrogen atom contained in the polyamine resin:

[Chemical Formula 1]

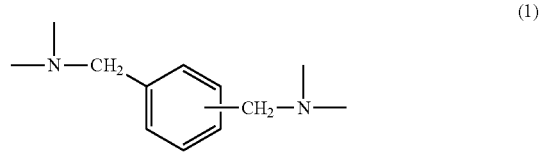

(1)

2. The laminate film according to the clause 1, wherein the metal atom is at least one selected from a group consisting of zinc, aluminium, magnesium, calcium, tin, copper, nickel, palladium, iron, chromium, molybdenum, titanium, rubidium, cesium, strontium, barium, zirconium, hafnium and manganese.

3. The laminate film according to the clause 1 or 2, wherein the polyamine resin is a reaction product of the following (A), (B) and (C):
   (A) At least one polyamine selected from a group consisting of an aromatic ring-having aliphatic amine, an aliphatic amine, an alicyclic amine, and an aromatic amine;
   (B) A polyfunctional compound having at least one acyl group and capable of forming an amide group moiety through reaction with a polyamine and forming an oligomer;
   (C) A metal (meth)acrylate salt.
4. The laminate film according to the clause 3, wherein (A) is metaxylylenediamine or paraxylylenediamine.
5. The laminate film according to the clause 3, wherein (B) is an acrylic acid or methacrylic acid, or an ester, amide, acid anhydride or acid chloride thereof.
6. The laminate film according to the clause 3, wherein (C) is zinc acrylate, magnesium acylate or calcium acrylate.
7. The laminate film according to the clause 3, wherein the reaction molar ratio of (C) to (A) ((C)/(A)) is from 0.05 to 0.35.
8. The laminate film according to any of the clause 1 to clause 7, wherein the oxygen transmission coefficient of the polyamine resin is 2.0 ml·mm/(m$^2$·day·MPa) (23° C., 60% RH) or less.

Advantage of the Invention

The adhesive coating material for use in the laminate film of the present invention has good gas barrier performance and adhesiveness, and has a long pot life as being a type of one-pack coating material and is therefore excellent in workability. Accordingly, the laminate film of the present invention to be obtained by the use of the adhesive coating material is excellent in gas barrier performance and, in addition thereto, also excellent in adhesiveness, and is applicable to various uses as non-halogen gas-barrier materials. In addition, the laminate film can be produced economically and advantageously in point of the workability thereof, and is therefore industrially useful.

MODE FOR CARRYING OUT THE INVENTION

The laminate film of the present invention has at least a substrate, an adhesive coating material layer and a sealant layer laminated in this order; and in case where the laminate film is formed into a bag, the substrate layer is the outer surface of the bag and the sealant layer is the inner surface thereof.

[Substrate]

As the substrate of the laminate film of the present invention, for example, usable are polyester films of polyethylene terephthalate, polybutylene terephthalate or the like, polyamide films of nylon 6, nylon 6,6, polymetaxylylenadipamide (N-MXD6) or the like, polyolefin films of low-density polyethylene, high-density polyethylene, linear low-density polyethylene, polypropylene or the like, polyacrylonitrile films, poly(meth)acrylic films, polystyrene films, polycarbonate films, ethylene-vinyl alcohol copolymer (EVOH) films, polyvinyl alcohol films, polyacrylonitrile films, polycarbonate films, biodegradable films of polylactic acid or the like, papers of carton or the like, metal foils of aluminium, copper or the like, films produced by coating various materials for these substrates with various polymers such as polyvinylidene chloride (PVDC) resin, polyvinyl alcohol resin, saponified ethylene-vinyl acetate copolymer resin, acrylic resin or the like, films produced by vapor deposition of a metal such as aluminium or the like on these substrate materials, films produced by dispersing an inorganic filler or the like in these substrate materials, films in which an oxygen trapping function is given, etc.

An inorganic filler may also be dispersed in those coating polymers. The inorganic filler includes silica, alumina, mica, talc, aluminium flakes, glass flakes, etc. Preferred are phyllosilicates such as montmorillonite, etc. As the method for dispersion, for example, usable is any known conventional method such as an extrusion kneading method, a method of mixing and dispersion in a resin solution, or the like.

As the method of giving an oxygen trapping function, for example, there is mentioned a method of using at least partly a composition that contains a low-molecular organic compound capable of reacting with oxygen, such as hindered phenols, vitamin C, vitamin E, organic phosphorus compounds, gallic acid, pyrogallol or the like; and a transition metal compound such as cobalt, manganese, nickel, iron, copper or the like; etc.

The thickness of the film may be, for practical use, from 10 to 300 μm or so, but is preferably from 10 to 100 μm or so. In case where the film is a plastic film, it may be monoaxially or biaxially stretched.

In addition to the substrate, the adhesive coating material layer and the sealant layer, the film of the present invention may be laminated with an additional layer of the above-mentioned film material of polyolefin, polyester or the like (for example, between the adhesive coating material layer and the sealant layer). In this case, the film material may be one with silica deposition or alumina deposition thereon. In laminating the materials, the film may have multiple adhesive coating material layers. Any other coating material and/or adhesive than the adhesive coating material in the present invention may also be used here along with the adhesive coating material.

[Sealant Layer]

As the sealant layer in the laminate film of the present invention, preferably used is a flexible polymer film. In consideration of expressing good heat sealability, preferred is use of a polyolefin film such as a polyethylene film, a polypropylene film, an ethylene-vinyl acetate copolymer film, etc. The thickness of the film may be, for practical use, from 10 to 300 μm or so, but is preferably from 10 to 100 μm or so. The film surface may be processed for various surface treatment such as flame treatment, corona discharge treatment or the like.

[Adhesive Coating Material Layer]

The adhesive coating material layer in the laminate film of the present invention is formed of an adhesive coating material containing a polyamine resin, and the polyamine resin contains a skeletal structure represented by the following formula (1) in an amount of at least 40% by mass, preferably at least 45% by mass, more preferably at least 50% by mass, and the polyamine resin contains a metal atom in an amount of from 2.0 to 20 mol %, preferably from 3.0 to 20 mol %, more preferably from 5.0 to 17.5 mol %, even more preferably from 7.5 to 15 mol %, still more preferably from 7.5 to 12.5 mol % relative to the nitrogen atom contained in the polyamine resin.

[Chemical Formula 2]

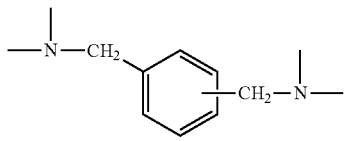

(1)

Since the polyamine resin has the skeletal structure represented by the above-mentioned formula (1) and contains a metal atom on a high level, the adhesive coating material expresses high gas barrier performance while maintaining the adhesiveness thereof. According to the present invention, the polyamine resin having an oxygen transmission coefficient at 23° C. and 60% RH of 2.0 ml·mm/(m²·day·MPa) or less can be obtained. The polyamine resin is described below.

(Polyamine Resin)

The polyamine resin in the present invention includes amide oligomers or urea oligomers to be obtained through reaction of a polyamine and a polyfunctional compound having at least one acyl group or isocyanate group.

The polyamine includes aliphatic amines such as ethylenediamine, diethylenetriamine, triethylenetetramine, tetraethylenepentamine, etc.; aromatic ring-having aliphatic amines such as metaxylylenediamine, paraxylylenediamine, etc.; alicyclic amines such as 1,3-bis(aminomethyl)cyclohexane, isophoronediamine, norbornanediamine, etc.; aromatic amines such as diaminodiphenylmethane, metaphenylenediamine, etc.; heterocyclic compounds, etc. One alone or two or more of these may be used here either singly or as combined.

The polyfunctional compound having at least one acyl group includes carboxylic acids such as acrylic acid, methacrylic acid, maleic acid, fumaric acid, succinic acid, malic acid, tartaric acid, adipic acid, isophthalic acid, terephthalic acid, pyromellitic acid, trimellitic acid, etc., and their derivatives such as esters, amides, acid anhydrides, acid chlorides, etc.

The polyfunctional compound having at least one isocyanate group includes p-phenylene diisocyanate, 4,4'-diphenyl diisocyanate, 1,5-naphthalene diisocyanate (NDI), 4,4'-, 2,4'- or 2,2'-diphenylmethane diisocyanate or their mixture (MDI), 2,4- or 2,6-tolylene diisocyanate or their mixture (TDI), 4,4'-toluidine diisocyanate (TODI), 4,4'-diphenyl ether diisocyanate, 1,3- or 1,4-xylylene diisocyanate or their mixture (XDI), 1,3- or 1,4-tetramethylxylylene diisocyanate or their mixture (TMXDI), ω,ω'-diisocyanate-1,4-diethylbenzene, 1,3-cyclopentene diisocyanate, 1,4-cyclohexane diisocyanate, 1,3-cyclohexane diisocyanate, 3-isocyanatemethyl-3,5,5-trimethylcyclohexyl isocyanate (isophorone diisocyanate: IPDI), 4,4'-, 2,4'- or 2,2'-dicyclohexylmethane diisocyanate or their mixture (hydrogenated MDI), methyl-2,4-cyclohexane diisocyanate, methyl-2,6-cyclohexane diisocyanate, 1,3- or 1,4-bis(isocyanatemethyl)cyclohexane or their mixture (hydrogenated XDI), bis(isocyanatemethyl)norbornane, hexamethylene diisocyanate, and their modified derivatives, etc.

The metal atom to be contained in the polyamine resin is preferably a divalent or more polyvalent metal. The divalent or more polyvalent metal includes zinc, aluminium, magnesium, calcium, tin, copper, nickel, palladium, iron, chromium, molybdenum, titanium, rubidium, cesium, strontium, barium, zirconium, hafnium, manganese, etc. Especially preferred are zinc, magnesium and calcium. Introducing the metal atom into the polyamine resin may be attained, for example, by reacting a metal salt of (meth)acrylic acid with a polyamine in the manner described below.

In the present invention, a reaction product of the following (A), (B) and (C) is preferably used as the polyamine resin. Using the polyamine resin of the type secures expression of high gas barrier performance and good adhesiveness.

(A) At least one polyamine selected from a group consisting of an aromatic ring-having aliphatic amine, an aliphatic amine, an alicyclic amine and an aromatic amine.

(B) A polyfunctional compound having at least one acyl group and capable of forming an amide group moiety through reaction with a polyamine and forming an oligomer.

(C) A metal (meth)acrylate salt.

As (A), used is at least one polyamine selected from a group consisting of an aromatic ring-having aliphatic amine, an aliphatic amine, an alicyclic amine and an aromatic amine. As the aromatic ring-having aliphatic amine, preferred are metaxylylenediamine, paraxylylenediamine, etc.; as the aliphatic amine, preferred are ethylenediamine, diethylenetriamine, triethylenetetramine, tetraethylenepentamine, etc.; as the alicyclic amine, preferred are 1,3-bis(aminomethyl)cyclohexane, isophoronediamine, norbornanediamine, etc.; and as the aromatic amine, preferred are diaminodiphenylmethane, metaphenylenediamine, etc. Especially preferred are metaxylylenediamine and paraxylylenediamine. One or more of these compounds may be used here either singly or as combined.

The polyfunctional compound (B) having at least one acyl group and capable of forming an amide group moiety through reaction with a polyamine and forming an oligomer includes carboxylic acids such as acrylic acid, methacrylic acid, maleic acid, fumaric acid, succinic acid, malic acid, tartaric acid, adipic acid, isophthalic acid, terephthalic acid, pyromellitic acid, trimellitic acid, etc., and their derivatives such as esters, amides, acid anhydrides, acid chlorides, etc. Especially preferred are acrylic acid, methacrylic acid and their derivatives.

If desired, a monocarboxylic acid having from 1 to 8 carbon atoms such as formic acid, acetic acid, propionic acid, butyric acid, lactic acid, glycolic acid, benzoic acid or the like, or its derivative such as an ester, amide, acid anhydride, acid chloride or the like thereof may be used along with the above-mentioned polyfunctional compound (B), and may be reacted with the starting polyamine. The amide group moiety to be introduced through the reaction has a high cohesive force, and presence of the amide group moiety in the polyamine resin in a high ratio secures expression of higher gas barrier performance and good adhesion strength.

The metal in the metal (meth)acrylate salt (above (C)) includes a divalent or more polyvalent metal such as zinc, aluminium, magnesium, calcium, tin, copper, nickel, palladium, iron, chromium, molybdenum, titanium, rubidium, cesium, strontium, barium, zirconium, hafnium, manganese, etc. Especially preferred are zinc, magnesium and calcium. An aqueous solution of the metal salt may also be used here. One alone or two or more different types of the above (C) may be used here either singly or as combined.

In the present specification, "acrylic acid" and "methacrylic acid" may be referred to as a general term, (meth)acrylic acid.

As (C), more preferred is zinc acrylate, magnesium acrylate or calcium acrylate as industrially available with ease.

Regarding the reaction of (A), (B) and (C), first (A), (B) and (C) are mixed under the condition of from 0 to 100° C., then reacted for amide group formation through dehydration, dealcoholation and deamination under the condition of from 100 to 300° C., preferably from 120 to 250° C.

These may be mixed in any desired order, but preferably, (A) and (C) are first fed into a reactor and then (B) is added thereto for addition reaction.

For completing the amide group formation reaction, if desired, the reactor may be depressurized in the final stage of the reaction. Also if desired, a non-reactive solvent may be used to dilute the system. Further, a catalyst of phosphites or the like may be added to the system, as a dehydrating agent and a dealcoholating agent.

On the other hand, in case when an acid anhydride or an acid chloride is used as (B), the reactants are mixed under the condition of from 0 to 150° C., preferably from 0 to 100° C., and then reacted for amide group formation.

For completing the amide group formation reaction, as necessary, the reactor may be depressurized in the final stage of the reaction. Also if needed, a non-reactive solvent may be used to dilute the system. Further, a tertiary amine such as pyridine, picoline, lutidine, trialkylamine or the like may be added to the system.

The amide group moiety to be introduced through the reaction has a high cohesive force, and presence of the amide group moiety in the polyamine resin in a high ratio secures expression of higher gas barrier performance and good adhesion strength to substrates of metal, concrete, plastics, etc.

The reaction ratio by mol of (B) to (A) ((B)/(A)) is preferably within a range of from 0.3 to 1.5, more preferably from 0.5 to 1.4, even more preferably from 0.6 to 1.3. Within the range, a sufficient amount of the amide group can be formed in the polyamine resin and the molecular weight of the polyamine resin can be enough to form a coating film of the adhesive coating material, and accordingly, the polyamine resin can express high gas barrier performance and excellent coating film performance and can secure good workability.

The reaction ratio by mol of (C) to (A) ((C)/(A)) is preferably within a range of from 0.05 to 0.35, more preferably from 0.15 to 0.30, even more preferably from 0.15 to 0.25. When the molar ratio is at least 0.05, then the polyamine resin can express good gas barrier performance and adhesiveness; and when at most 0.35, then the polyamine resin can secure good workability. The reaction ratio by mol of (B)+(C) to (A) ((B)+(C)/(A)) is preferably within a range of from 0.4 to 1.8. When the molar ratio is at least 0.4, then a sufficient amount of the amide group may be formed in the polyamine resin, and therefore the polyamine resin can express good gas barrier performance and adhesiveness. In addition, the proportion of the volatile molecules remaining in the polyamine resin can be kept properly and the polyamine resin to be obtained here does not emit any offensive odor. When the molar ratio is at most 1.8, then the solubility of the polyamine resin in organic solvent is good.

Especially when the high gas barrier performance, the high adhesiveness, the control of offensive odor emission and the high gas barrier performance in high-humidity environments of the polyamine resin to be obtained here are taken into consideration, the molar ratio of the polyfunctional compound to the polyamine component (((B)+(C))/(A)) is more preferably within a range of from 0.6 to 1.5.

Preferably, the oxygen transmission coefficient of the polyamine resin in the present invention is 2.0 ml·mm/m²·day·MPa (23° C., 60% RH) or less.

Here, the laminate strength of the laminate film, as produced by the use of the adhesive coating material in the present invention, at a peeling speed of 300 mm/min immediately after lamination is preferably at least 30 g/15 mm, more preferably at least 40 g/15 mm, even more preferably at least 50 g/15 mm. When the laminate strength is satisfactory, then there does not occur any problem of laminate film tunneling or irregular film winding.

For preventing irregular film winding, the film is required to have a high shear strength; and when expression the high shear strength of the film is taken into consideration, then the polyamine resin to be used for the film is preferably such that the molar ratio (((B)+(C))/(A)) is within a range of from 0.6 to 1.8, more preferably from 0.7 to 1.6, even more preferably from 0.8 to 1.5, and the mean molecular weight of the reaction product, oligomer is increased. More preferably, the polyamine resin is a reaction product of metaxylylenediamine, and acrylic acid, methacrylic acid and/or their derivatives, and a metal (meth)acrylate salt. The reaction ratio by mol of acrylic acid, methacrylic acid and/or their derivatives and the metal (meth)acrylate salt to metaxylylenediamine is preferably within a range of from 0.8 to 1.5.

[Adhesive Coating Material]

The adhesive coating material in the present invention contains the above-mentioned polyamine resin, and forms the adhesive coating material layer in the laminate film of the present invention. The adhesive coating material in the present invention comprises the above-mentioned polyamine resin as the main ingredient thereof, and from the viewpoint of the gas barrier performance and the adhesiveness thereof, the content of the polyamine resin in the adhesive coating material is preferably from 50 to 100% by mass, more preferably from 60 to 100% by mass.

If desired, the adhesive coating material in the present invention may be mixed with a thermosetting resin composition such as a polyurethane resin composition, a polyacrylic resin composition, a polyurea resin composition or the like, within a range not detracting from the advantage of the present invention.

If desired, the adhesive coating material in the present invention may contain, as added thereto, a wetting agent such as a silicone or acrylic compound for assisting the wet condition of the surfaces of various materials to be coated therewith. As suitable wetting agents, there are BYK331, BYK333, BYK340, BYK347, BYK348, BYK354, BYK380, BYK381 and others available from BYK-Chemie. In case where the additive is added, the amount thereof is preferably within a range of from 0.01 to 2.0% by mass based on the mass of the polyamine resin.

For the purpose of enhancing the adhesiveness thereof to various materials immediately after application, if needed, the adhesive coating material of the present invention may contain, as added thereto, a tackifier such as a xylene resin, a terpene resin, a phenolic resin, a rosin resin or the like. In case where the additive is added, the amount thereof is preferably within a range of from 0.01 to 5.0% by mass based on the mass of the polyamine resin.

For the purpose of enhancing the gas barrier performance and the adhesiveness thereof, the adhesive coating material of the present invention may contain, optionally added thereto, an aldehyde such as formaldehyde, acetaldehyde, glyoxal or the like, or a carboxylic acid anhydride such as acetic anhydride, propionic anhydride or the like. In case where the additive is added, the amount thereof is preferably within a range of from 10 to 80 mol % relative to the nitrogen atom contained in the polyamine resin.

For the purpose of improving various properties of gas barrier performance, impact resistance, heat resistance and the like of the adhesive coating material layer to be formed of the adhesive coating material (hereinafter this may be referred to as "polyamine resin composition") in the present invention, an inorganic filler such as silica, alumina, mica, talc, aluminium flakes, glass flakes or the like may be added to the adhesive coating material. When the film transparency is taken into consideration, the inorganic filler is preferably tabular. In case where the additive is added, the amount thereof is preferably within a range of from 0.01 to 10% by mass based on the mass of the polyamine resin.

If needed, the adhesive coating material in the present invention may contain, as added thereto, a compound having an oxygen trapping function or the like. The compound having an oxygen trapping function includes, for example, low-molecular organic compounds capable of reacting with oxygen, such as hindered phenols, vitamin C, vitamin E, organic phosphorus compounds, gallic acid, pyrogallol, etc.; transition metal compounds such as cobalt, manganese, nickel, iron, copper or the like; etc.

For enhancing the adhesiveness of the adhesive coating material layer to be formed of the adhesive coating material in the present invention, a coupling agent such as a silane coupling agent, a titanium coupling agent or the like may be added to the adhesive coating material. In case where the agent is added, the amount thereof is preferably within a range of from 0.01 to 5.0% by mass based on the mass of the polyamine resin.

The adhesive coating material in the present invention is characterized by having good adhesiveness and, in addition thereto, high gas barrier performance. Consequently, the laminate film using the adhesive coating material of the present invention expresses extremely high-level gas barrier performance, not using any gas-barrier material generally used in the art, such as a PVDC coat layer, a polyvinyl alcohol (PVA) coat layer, an ethylene-vinyl alcohol copolymer (EVOH) film layer, a polymetaxylylenadipamide film layer or the like. Further, using the adhesive coating material for sticking these conventional gas-barrier material and sealant material makes it possible to extremely enhance the gas barrier performance of the obtained laminate films.

[Production Method for Laminate Film]

In case where various film materials are laminated by the use of the adhesive coating material in the present invention, there may be employed known lamination methods of dry lamination, non-solvent lamination, extrusion lamination or the like. In the present invention, preferred is dry lamination.

In case where the adhesive coating material in the present invention is applied to various materials and the materials are laminated, the concentration and the temperature of the polyamine resin composition must be sufficient for providing the intended adhesive coating material layer, and the conditions may vary depending on the starting materials and the lamination method to be selected. Specifically, the concentration of the polyamine resin composition may vary in a broad range, depending on the type and the molar ratio of the selected materials and the selected lamination method. Concretely, the concentration of polyamine the resin composition may be in various conditions covering from a case of not using a solvent to a case of using a suitable type of an organic solvent and/or water to dilute the composition to have a concentration of about 5% by mass or so.

As the organic solvent, any type of solvent may be used capable of dissolving the adhesive coating material. For example, the solvent includes water-insoluble solvents such as toluene, xylene, methyl acetate, ethyl acetate, butyl acetate, acetone, methyl ethyl ketone, etc.; glycol ethers such as 2-methoxyethanol, 2-ethoxyethanol, 2-propoxyethanol, 2-butoxyethanol, 1-methoxy-2-propanol, 1-ethoxy-2-propanol, 1-propoxy-2-propanol, etc.; alcohols such as methanol, ethanol, 1-propanol, 2-propanol, 1-butanol, 2-butanol, etc.; aldehydes such as acetaldehyde, propionaldehyde, etc.; aprotic polar solvents such as N,N-dimethylformamide, N,N-dimethylacetamide, dimethylsulfoxide, N-methylpyrrolidone, etc.

The adhesive coating material diluted with a solvent (hereinafter this may be referred to as "coating liquid") is so diluted that its concentration could fall within a range of from 5 to 30 seconds (25° C.) as the Zahn cup (No. 3) viscosity. When the Zahn cup (No. 3) viscosity is 5 seconds or more, then the adhesive coating material can be fully applied to the subject to be coated therewith, not proving any trouble such as roll contamination. When the Zahn cup (No. 3) viscosity is 30 seconds or less, then the adhesive coating material can be fully transferred to a roll and can easily form a uniform adhesive coating material layer. For example, in dry lamination, the Zahn cup (No. 3) viscosity is preferably from 10 to 20 seconds (25° C.) during use of the coating material.

In preparing the coating liquid in the present invention, a defoaming agent such as a silicone or acrylic compound may be added to the coating liquid for the purpose of preventing the coating liquid from foaming. As suitable defoaming agents, there are BYK019, BYK052, BYK063, BYK065, BYK066N, BYK067N, BYK070 and BYK080 available from BYK Chemie; and Disparlon 1930N and 1934 available from Kusumoto Chemicals; etc. Especially preferred is BYK065. In case where the defoaming agent is added, the amount thereof is preferably within a range of from 0.001 to 3.0% by mass based on the mass of the polyamine resin in the coating liquid, more preferably from 0.005 to 2.0% by mass.

In case where a solvent is used, the solvent drying temperature after the application of the adhesive coating material may be variously within a range of from 20° C. to 140° C., but is preferably near the boiling point of the solvent not having any influence on the coated subjects. When the drying temperature is lower than 20° C., then the solvent may remain in the laminate film to cause adhesion failure or odor emission. When the drying temperature is higher than 140° C., then the polymer film may soften and therefore a laminate film having a good appearance would be difficult to obtain. For example, in case where the adhesive coating material is applied to a stretched polypropylene film, the temperature is preferably within a range of from 40 to 120° C.

The coating mode in applying the adhesive coating material may be any ordinary coating mode of roll coating, spray coating, air knife coating, dipping, brushing or the like. Preferred is roll coating or spray coating. For example, the same roll coating or spraying technique and equipment as those in a case of applying a polyurethane adhesive component to a polymer film for lamination are applicable to the present invention.

Subsequently, concrete operation for lamination is described.

In dry lamination, the coating liquid is applied to a substrate using a roll such as a gravure roll or the like, then the solvent is removed by drying, and immediately a new film material is stuck to the coated surface by nip rolls to give a laminate film.

In dry lamination, the solvent in preparing the adhesive coating material is preferably a solvent having good solubility, having a relatively low boiling point and containing an alcohol having 3 or less of carbon atoms, and as an example thereof, there is mentioned a solvent containing, as the main ingredient thereof, at least one selected from a group consisting of methanol, ethanol, isopropanol and n-propanol. Further, a solvent having a functional group such as an ester group, a ketone group or the like may be added thereto. As an example of the solvent having any functional group of an ester group, a ketone group or the like, there may be mentioned a mixture liquid prepared by mixing one or more selected from a group consisting of methyl acetate, ethyl acetate, acetone and methyl ethyl ketone, having a relatively low boiling point. In order to reduce the amount of the solvent to remain in the obtained laminate film, the content of the solvent having a functional group of an ester group, a ketone group or an aldehyde group is preferably at most 20% by mass of all the solvents. In case the amount of the solvent to remain in the laminate film is large, then the solvent may be a cause of an offensive odor. Therefore, in practical use, the amount of the remaining solvent is 7 mg/m$^2$ or less. When the amount is larger than 7 mg/m$^2$, then the film may have an offensive odor. In case where the odor of the film must be controlled strictly, the amount is preferably 5 mg/m$^2$ or less, more preferably 3 mg/m$^2$ or less.

In dry lamination, the adhesive coating material may be applied to the sealant layer. Concretely, the adhesive coating material may be applied to a polyolefin film such as a polyethylene film, a polypropylene film, an ethylene-vinyl acetate copolymer film or the like, then dried, and thereafter stuck to a substrate of a stretched polypropylene film, polyamide film, polyethylene terephthalate film or the like to give a laminate film.

In case where the films are stuck by the use of nip rolls, the nip rolls may be heated at 20 to 120° C. for sticking them, but preferably at 40 to 100° C.

In non-solvent lamination, the adhesive coating material in the present invention that has been previously heated at 40 to 100° C. or so may be applied to a film material including a substrate, using a roll such as a gravure roll that has been heated at 40 to 120° C., and immediately a new film material may be stuck to the coated surface to give a laminate film.

In extrusion lamination, the polyamine resin that is the main ingredient of the adhesive coating material in the present invention is diluted with an organic solvent and/or water to give a diluted solution, and the solution is, serving as an adhesion assistant (anchor coat agent), applied to a film material including a substrate using a roll such as a gravure roll or the like, then the solvent is removed by drying at 20 to 140° C. and curing is performed, and thereafter a polymer material having been melted through an extruder is laminated on the cured layer to give a laminate film. As the polymer material to be melted, preferred is a polyolefin resin such as a low-density polyethylene resin, a linear low-density polyethylene resin, an ethylene-vinyl acetate copolymer resin or the like. These lamination methods and any other ordinary lamination methods may be optionally combined in any desired manner, and depending on the use and the form thereof, the layer configuration of the laminate film may be varied.

The thickness of the adhesive coating material layer formed by applying the adhesive coating material in the present invention to various materials followed by drying, sticking and heat-treating it, is preferably from 0.1 to 100 μm, more preferably from 0.5 to 10 μm in practical use. When the thickness is 0.1 μm or more, then the layer can express sufficient gas barrier performance and adhesiveness. On the other hand, when the thickness is 100 μm or less, then the adhesive coating material layer having a uniform thickness is easy to form.

[Laminate Film]

The laminate film of the present invention has an excellent laminate strength. Though varying depending on the material of the substrate and the sealant layer, the laminate strength of the film at a peeling speed of 300 m/min is, for example, preferably 80 g/15 mm or more when the substrate is stretched polypropylene, more preferably 100 g/15 mm or more, even more preferably 120 g/15 mm or more. On the other hand, when the substrate is stretched nylon or polyethylene terephthalate and when the sealant layer is low-density polyethylene or unstretched polypropylene, then the laminate strength is preferably 120 g/15 mm or more, more preferably 250 g/15 mm or more, even more preferably 300 g/15 mm or more. The laminate strength may be measured according to the method described in the section of Examples.

The laminate film produced by the use of the adhesive coating material in the present invention can be used as a multilayer wrapping material for protection of foods, drugs, etc. In case where the film is used as a multilayer wrapping material, the layer configuration thereof may change depending on the content, to be wrapped with the film the usage environment and the usage type thereof. Specifically, the laminate film of the present invention may be used as a multilayer wrapping material directly as it is, or if desired, the laminate film of the present invention may be further laminated with an oxygen absorbent layer, a thermoplastic resin film layer, a paper layer, a metal foil layer or the like. In this case, the additional layer may be laminated using the adhesive coating material in the present invention, or may be laminated using any other coating material, adhesive agent or anchor agent.

A wrapping pouch such as a soft wrapping pouch or the like to be produced by the use of the multilayer wrapping material is described. The wrapping pouch such as a soft wrapping pouch or the like may be produced using the multilayer wrapping material. Briefly, two sheets of the wrapping material are put one on top of the other with the side of the heat-sealable resin layer of one sheet kept facing the side thereof of the other, then the peripheral part of the two are heat-sealed to give the intended wrapping pouch. Regarding the pouch-producing method, for example, the multilayer wrapping material may be folded or two sheets of the material may be put one on top of the other in such a manner that the inner surface of one could face that of the other, then the peripheral part is heat-sealed in a mode of, for example, side sealing, two-direction sealing, three-direction sealing, four-direction sealing, envelope-type sealing, butt seaming (pillow-type sealing), gather sealing, flat bottom sealing, square bottom sealing, gazette sealing and any other type of sealing. The wrapping pouch may have various configurations depending on the contents to be charged therein and on the usage environment and the usage type thereof. In addition, for example, the laminate film of the present invention is usable for standing pouches, etc. Regarding the heat-sealing method, for example, employable here are various known methods of bar sealing, rotary roll sealing, belt sealing, impulse sealing, high frequency sealing, ultrasonic sealing, etc.

A content is charged into the wrapping pouch from its opening mouth, then the opening mouth may be heat-sealed to give a wrapped product that uses the wrapping pouch of the present invention. The content to be charged in the pouch includes various foods, for example, confectionery such as rice confectionery, bean confectionery, nuts, biscuits, cookies, wafers, marshmallows, pies, semi-baked cake, candies, snack foods, etc.; staples such as bread, snack noodles, instant noodles, dried noodles, pasta, aseptic-packaged cooked rice, soupy rice, rice gruel, packed rice cake, cereal foods, etc.; processed agricultural products such as pickles, boiled beans, fermented soybeans, miso (soybean paste), frozen bean curd (made by exposing bean curd to cold outdoor weather), bean curd, cooked enoki mushrooms (*Flammulina velutipes*), jelly-like food made from konjak (starch of devil's tongue), processed edible wild plants, jams, peanut creams, salads, frozen vegetables, processed potatoes, etc.; processed livestock products such as hams, beacons, sausages, processed chicken products, corned beefs, etc.; processed marine products such as fish hams, sausages, marine paste products, boiled fish pastes, seaweed (laver), foods boiled in soy sauce, dried bonitos, salted fish guts, smoked salmons, karashimentaiko (food made of salted cod roe with red pepper), etc.; fruity fleshes such as peach, orange, pineapple, apple, pear, cherry, etc.; vegetables such as corn, asparagus, mushroom, onion, carrot, Japanese radish, potato, etc.; cooked foods, for example, frozen household dishes or chilled household dishes such as typically hamburgers, meat balls, marine fries, dumplings, croquettes, etc.; milk products such as butter, margarine, cheese, cream, instant creamy powder, modified milk powder for infant, etc.; other foods such as liquid seasonings, retorted curry, pet foods, etc. In addition, the wrapping pouch may also be used as a wrapping material for tobaccos, disposable body warmers, drugs, cosmetics, etc.

EXAMPLES

The present invention is described concretely with reference to the following Examples. However, the invention should not be limited whatsoever by these Examples.

The adhesive coating material solutions A to F containing a polyamine resin were prepared according to the methods mentioned below.

Adhesive Coating Material Solution A

One mol of metaxylylenediamine and 0.23 mol of zinc acrylate were put into a reactor. This was heated up to 60° C. in a nitrogen current atmosphere, and 0.70 mol of methyl acrylate was dropwise added thereto taking 1 hour. While the formed methanol was evaporated away, this was heated up to 165° C., and kept at 165° C. for 1.0 hour. Methanol in an amount corresponding to a solid concentration of 45% was dropwise added thereto taking 1.5 hours, thereby to prepare an adhesive coating material solution A containing a polyamine resin.

Adhesive Coating Material Solution B

One mol of metaxylylenediamine and 0.20 mol of zinc acrylate were put into a reactor. This was heated up to 60° C. in a nitrogen current atmosphere, and 0.70 mol of methyl acrylate was dropwise added thereto taking 1 hour. While the formed methanol was evaporated away, this was heated up to 165° C., and kept at 165° C. for 1.0 hour. Methanol in an amount corresponding to a solid concentration of 45% was dropwise added thereto taking 1.5 hours, thereby to prepare an adhesive coating material solution B containing a polyamine resin.

Adhesive Coating Material Solution C

One mol of metaxylylenediamine and 0.20 mol of magnesium acrylate were put into a reactor. This was heated up to 60° C. in a nitrogen current atmosphere, and 0.70 mol of methyl acrylate was dropwise added thereto taking 1 hour. While the formed methanol was evaporated away, this was heated up to 165° C., and kept at 165° C. for 1.0 hour. Methanol in an amount corresponding to a solid concentration of 45% was dropwise added thereto taking 1.5 hours, thereby to prepare an adhesive coating material solution C containing a polyamine resin.

Adhesive Coating Material Solution D 0.31 mol of acrylic acid was added to the adhesive coating material solution A, heated up to 60° C. in a nitrogen current atmosphere, and kept as such for 3 hours. Methanol in an amount corresponding to a solid concentration of 45% was dropwise added thereto taking 1.5 hours, thereby to prepare an adhesive coating material solution D containing a polyamine resin.

Adhesive Coating Material Solution E

One mol of metaxylylenediamine was put into a reactor. This was heated up to 60° C. in a nitrogen current atmosphere, and 0.93 mol of methyl acrylate was dropwise added thereto taking 1 hour. While the formed methanol was evaporated away, this was heated up to 165° C., and kept at 165° C. for 2.5 hours. Methanol in an amount corresponding to a solid concentration of 45% was dropwise added thereto taking 1.5 hours, thereby to prepare an adhesive coating material solution E containing a polyamine resin.

Adhesive Coating Material Solution F

One mol of metaxylylenediamine and 0.10 mol of zinc acrylate were put into a reactor. This was heated up to 60° C. in a nitrogen current atmosphere, and 0.80 mol of methyl acrylate was dropwise added thereto taking 1 hour. While the formed methanol was evaporated away, this was heated up to 165° C., and kept at 165° C. for 1.0 hour. Methanol in an amount corresponding to a solid concentration of 45% was dropwise added thereto taking 1.5 hours, thereby to prepare an adhesive coating material solution F containing a polyamine resin.

Evaluation methods for gas barrier performance and laminate strength are as follows.

<Oxygen Transmission Coefficient (ml·mm/m$^2$·day·MPa)>

An oxygen transmission meter (by Modern Control, OX-TRANS2/21) was used. The adhesive coating material solution containing a polyamine resin was applied onto a substrate, and a sealant film was stuck thereto to prepare a laminate film. The laminate film, the substrate alone, and the sealant film alone were measured for the oxygen transmission rate thereof under the condition of 23° C. and a relative humidity of 60%, using the oxygen transmission meter. The oxygen transmission coefficient of the coating film of the adhesive coating material was calculated according to the following formula:

$$1/R_1 = 1/R_2 + DFT/P + 1/R_3$$

wherein:

$R_1$=oxygen transmission rate of the laminate film (ml·mm/m$^2$·day·MPa).

$R_2$=oxygen transmission rate of the substrate (ml·mm/m$^2$·day·MPa).

$R_3$=oxygen transmission rate of the sealant film (ml·mm/m$^2$·day·MPa).

DFT=thickness of the coating film of the adhesive coating material (mm).

P=Oxygen transmission coefficient of the coating film of the adhesive coating material.

<Laminate Strength (g/15 mm)>

Using the method designated in JISK-6854, the laminate strength of the laminate film was measured according to the T-shape peeling test at a peeling speed of 300 mm/min.

Example 1

<Measurement of Oxygen Transmission Coefficient and Laminate Strength>

Using a gravure roll with 100 lines/inch having a depth of 100 μm, the adhesive coating material solution A was applied onto a substrate, biaxially-stretched polypropylene film having a thickness of 20 μm (by Toyobo, P2161), then dried in a drying oven at from 60° C. (around the inlet port) to 90° C. (around the outlet port), and thereafter a sealant layer of a linear polyethylene film having a thickness of 40 μm (Tohcello's T.U.X. MC-S) was stuck thereto using nip rolls heated at 70° C., and wound up at a winding speed of 130 m/min to give a laminate film (L1) of substrate/polyamine resin-containing adhesive coating material layer/sealant layer.

The obtained laminate film (L1) was evaluated for the gas barrier performance and the laminate strength thereof. The oxygen transmission coefficient and the laminate strength of the laminate film are shown in Table 1.

Example 2

<Measurement of Oxygen Transmission Coefficient and Laminate Strength>

A laminate film (L2) was produced according to the same method as in Example 1 except that the adhesive coating material solution B was used in place of the adhesive coating material solution A, and the oxygen transmission coefficient and the laminate strength thereof were measured. The results are shown in Table 1.

Example 3

<Measurement of Oxygen Transmission Coefficient>

The oxygen transmission coefficient was measured according to the same method as in Example 2. The result is shown in Table 1.

<Measurement of Laminate>

A polyurethane adhesive of an ethyl acetate solution containing 50 parts by mass of a polyether component (Toyo Morton's TM-319) and 50 parts by mass of a polyisocyanate component (Toyo Morton's CAT-19B) (having a solid concentration of 30% by mass) was applied onto a biaxially-stretched nylon film having a thickness of 15 μm (Toyobo's N1102), then dried at 85° C. for 10 seconds, and thereafter a stretched ester film having a thickness of 12 μm (Toyobo's E5200) was stuck thereto using nip rolls, thereby preparing a laminate film (X) to be a substrate.

A laminate film (L3) was produced according to the same method as in Example 2 except that the above-mentioned laminate film (X) was used as the substrate in place of the biaxially-stretched polypropylene film (Toyobo's P2161), and the laminate strength thereof was measured. The result is shown in Table 1.

Example 4

<Measurement of Oxygen Transmission Coefficient>

The oxygen transmission coefficient was measured according to the same method as in Example 1 except that the adhesive coating material solution C was used in place of the adhesive coating material solution A. The result is shown in Table 1.

<Measurement of Laminate Strength>

A laminate film (L4) was produced according to the same method as in Example 3 except that the adhesive coating material solution C was used in place of the adhesive coating material solution B, and the oxygen transmission coefficient and the laminate strength thereof were measured. The results are shown in Table 1.

Example 5

<Measurement of Oxygen Transmission Coefficient>

The oxygen transmission coefficient was measured according to the same method as in Example 4. The result is shown in Table 1.

<Measurement of Laminate Strength>

A laminate film (L5) was produced according to the same method as in Example 4 except that an aluminium foil having a thickness of 8 μm (Toyo Aluminium's aluminium foil 1N30) was used as the substrate in place of the laminate film (X), and the laminate strength thereof was measured. The result is shown in Table 1.

Example 6

<Measurement of Oxygen Transmission Coefficient>

The oxygen transmission coefficient was measured according to the same method as in Example 1 except that the adhesive coating material solution D was used in place of the adhesive coating material solution A. The result is shown in Table 1.

<Measurement of Laminate Strength>

A laminate film (L6) was produced according to the same method as in Example 3 except that the adhesive coating material solution D was used in place of the adhesive coating material solution B, and the oxygen transmission coefficient and the laminate strength thereof were measured. The results are shown in Table 1.

Example 7

<Measurement of Oxygen Transmission Coefficient and Laminate Strength>

A laminate film (L9) was produced according to the same method as in Example 1 except that the adhesive coating material solution F was used in place of the adhesive coating material solution A, and the oxygen transmission coefficient and the laminate strength thereof were measured. The results are shown in Table 1.

Comparative Example 1

<Measurement of Oxygen Transmission Coefficient and Laminate Strength>

A laminate film (L7) was produced according to the same method as in Example 1 except that the adhesive coating material solution E was used in place of the adhesive coating material solution A, and the oxygen transmission coefficient and the laminate strength thereof were measured. The results are shown in Table 1.

Comparative Example 2

<Measurement of Oxygen Transmission Coefficient>

The oxygen transmission coefficient was measured according to the same method as in Comparative Example 1. The result is shown in Table 1.

<Measurement of Laminate Strength>

A laminate film (L8) was produced according to the same method as in Comparative Example 1 except that the laminate film (X) was used as the substrate in place of the biaxially-stretched polypropylene film (Toyobo's P2161), and the laminate strength thereof was measured. The result is shown in Table 1.

TABLE 1

| | | | Adhesive Coating Material Layer | | | | |
| --- | --- | --- | --- | --- | --- | --- | --- |
| | Substrate | Sealant Layer | Adhesive Coating Material Solution | Skeletal Structure of Formula (1) in Polyamine Resin (% by mass) | Content of Metal Atom (relative to nitrogen atom) (mol %) | Oxygen Transmission Coefficient (ml · mm/ (m² · day · MPa) | Laminate Strength (g/15 mm) |
| Example 1 | biaxially-stretched PP film | linear PE film | A | 60 | 12 | 0.50 | 100 |
| Example 2 | biaxially-stretched PP film | linear PE film | B | 61 | 10 | 0.77 | 250 |
| Example 3 | laminate film (X) | linear PE film | B | 61 | 10 | 0.77 | 120 |
| Example 4 | laminate film (X) | linear PE film | C | 64 | 10 | 1.52 | 200 |
| Example 5 | Al foil | linear PE film | C | 64 | 10 | 1.52 | 150 |
| Example 6 | laminate film (X) | linear PE film | D | 54 | 12 | 0.25 | 100 |
| Example 7 | biaxially-stretched PP film | linear PE film | F | 66 | 5 | 1.55 | 100 |
| Comparative Example 1 | biaxially-stretched PP film | linear PE film | E | 71 | 0 | 4.31 | 100 |
| Comparative Example 2 | laminate film (X) | linear PE film | E | 71 | 0 | 4.31 | 120 |

INDUSTRIAL APPLICABILITY

The adhesive coating material for use in the laminate film of the present invention has high gas barrier performance and good adhesiveness, and is a one-pack adhesive composition; and therefore the material has a long pot life and gives good workability. Accordingly, the laminate film of the present invention, which is produced by sticking a substrate and a sealant film by the use of the adhesive coating material, is excellent in gas barrier performance and adhesiveness and is applicable to various uses as a non-halogen gas-barrier material, and in addition, the laminate film is excellent in economic efficiency and is industrially useful.

The invention claimed is:

1. A laminate film comprising at least a substrate, an adhesive coating material layer and a sealant layer laminated in this order, wherein the adhesive coating material to form the adhesive coating material layer comprises a polyamine resin, the polyamine resin contains a skeletal structure represented by the following formula (1) in an amount of at least 40% by mass, and the polyamine resin contains a metal atom in an amount of from 2.0 to 20 mol % relative to the nitrogen atom contained in the polyamine resin:

[Chemical Formula 1]

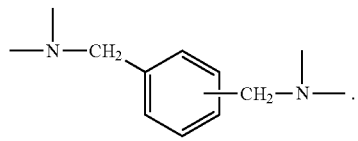

(1)

2. The laminate film according to claim 1, wherein the metal atom is at least one selected from a group consisting of zinc, aluminium, magnesium, calcium, tin, copper, nickel, palladium, iron, chromium, molybdenum, titanium, rubidium, cesium, strontium, barium, zirconium, hafnium and manganese.

3. The laminate film according to claim 1, wherein the polyamine resin is a reaction product of the following (A), (B) and (C):

(A) At least one polyamine selected from a group consisting of an aromatic ring-having aliphatic amine, an aliphatic amine, an alicyclic amine and an aromatic amine;

(B) A polyfunctional compound having at least one acyl group and capable of forming an amide group moiety through reaction with a polyamine and forming an oligomer;

(C) A metal (meth)acrylate salt.

4. The laminate film according to claim 3, wherein (A) is metaxylylenediamine or paraxylylenediamine.

5. The laminate film according to claim 3, wherein (B) is an acrylic acid or methacrylic acid, or an ester, amide, acid anhydride or acid chloride thereof.

6. The laminate film according to claim 3, wherein (C) is zinc acrylate, magnesium acylate or calcium acrylate.

7. The laminate film according to claim 3, wherein the reaction molar ratio of (C) to (A) ((C)/(A)) is from 0.05 to 0.35.

8. The laminate film according to claim 1, wherein the oxygen transmission coefficient of the polyamine resin is 2.0 ml·mm/(m²·day·MPa) (23° C., 60% RH) or less.

* * * * *